United States Patent

Emery et al.

[15] 3,661,707
[45] May 9, 1972

[54] MOLDING MACHINE INCLUDING MATING OF FORMING AND TRANSFER MOLDS

[72] Inventors: Roy W. Emery, 1 Donino Court, Toronto 12; John R. Emery, 46 Yorkminster Rd., Willowdale, Ontario, both of Canada

[22] Filed: July 7, 1969

[21] Appl. No.: 870,147

[30] Foreign Application Priority Data

Apr. 11, 1969 Canada..................................048413

[52] U.S. Cl..............................162/392, 162/228, 162/230
[51] Int. Cl. .........................................................D21j 7/00
[58] Field of Search...................162/391, 392, 227, 228, 230

[56] References Cited

UNITED STATES PATENTS

| | | | |
|---|---|---|---|
| 3,414,471 | 12/1968 | Hochart | 162/392 |
| 1,956,975 | 5/1934 | Belcher | 162/392 X |
| 1,894,089 | 1/1933 | Reamer | 162/392 |

*Primary Examiner*—S. Leon Bashore
*Assistant Examiner*—Alfred D'Andrea, Jr.
*Attorney*—Fetherstonhaugh & Co.

[57] ABSTRACT

This invention relates to a molding machine of the type used in the vacuum molding of wood pulp and like fibrous materials. With machines of this type, it has been difficult to achieve a deep draw because the molding elements that form the molding material into a compressed molded article tend to become misaligned. This results in an imperfection or hole in the molded article. With this invention, the two mating molds are positively controlled as they are brought into alignment with each other, with the result that it is possible to mold articles having a much deeper draw than was previously possible. It is also possible to operate the machine at a faster rate of speed.

A plurality of forming and transfer molds, mounted on respective carriers, are carried into and out of cooperative relationship by a control mechanism performing 2 control functions. The first control function moves a single pivot axis of each transfer mold with respect to the axis of rotation of the transfer mold carrier to positively maintain the pivot axis on a predetermined line during transfer. The second control function positively rotates the transfer molds about the single pivot axis to align the central axes of the transfer and forming molds as they are carried into and out of cooperative relationship with each other.

4 Claims, 7 Drawing Figures

PATENTED MAY 9 1972 3,661,707

INVENTORS
ROY W. EMERY
JOHN R. EMERY
BY *Fetherstonhaugh & Co.*
ATTORNEYS

INVENTORS
ROY W. EMERY
JOHN R. EMERY
BY
*Fetherstonhaugh & Co.*
ATTORNEYS

INVENTORS
ROY W. EMERY
JOHN R. EMERY
BY *Fetherstonhaugh & Co.*
ATTORNEYS and MOLDING MACHINE INCLUDING MATING OF FORMING AND TRANSFER MOLDS This invention relates generally to moulding machines of the type used in the vacuum moulding of wood pulp and like fibrous materials. More particularly, it relates to an improved control means for a moulding element, such as a transfer mould, that enters into cooperative relationship with the forming mould. The improved control means is adapted to control the cooperative relationship between the two moulding elements with more accurate alignment over an extended portion of the moulding cycle to permit the moulding elements to do their intended function. The improved control means may also be adapted to transfer the moulded product gently and accurately on a continuous basis to a continuously moving conveyor in closely spaced relation. With the invention, it is possible to make a large variety of moulded articles on a continuous basis at a fast rate of speed. Moulding machines according to this invention are especially useful for moulding products with deep draws and steep side walls.

The invention, then, relates to a moulding machine of the type having a plurality of first moulding elements, each having a principal mould axis, a plurality of second moulding elements, each having a principal mould axis, a first carrier for said first moulding elements, a second carrier for said second moulding elements, said carriers being rotatably mounted about parallel axes for continuous synchronized rotation in opposite directions to cyclically carry individual elements of said first moulding elements into and out of cooperative relationship with individual elements of said second moulding elements during their cyclic travel, the second moulding elements being forming moulds and during their cyclic travel, prior to entering into cooperative relationship with said first moulding elements, being adapted to accrete a layer of moulding material thereon. More specifically, the invention relates to an improved control means in such a machine for said first moulding elements which is adapted to control the alignment of said first moulding elements with said second moulding elements as they are carried into and out of cooperative relationship with each other. The improved control means comprises means for mounting said first moulding elements for pivotal movement on said first carrier about a pivot axis, said pivot axis being movable radially of the center of rotation of said first carrier, said second moulding elements being on said second carrier and each having its principal axis aligned in the same direction as its respective mould mounting radius on said second carrier, control means for moving said pivot axis with respect to the center of rotation of said first carrier to positively maintain said pivot axis on the locus of the intersection of a line through the axis of rotation of said first carrier that passes through said pivot axis and a line through said mould mounting radius of said second carrier as said moulds are carried into and out of cooperative relationship with each other, alignment control means for positively rotating said first moulding elements about their pivot axis to position the principal axes of said first moulding elements coincident with the principal axes of said second moulding elements with which they are adapted to cooperate as said moulds are carried into and out of cooperative relationship with each other.

The invention will be clearly understood after reference to the following detailed specification read in conjunction with the drawings.

Figure 6:
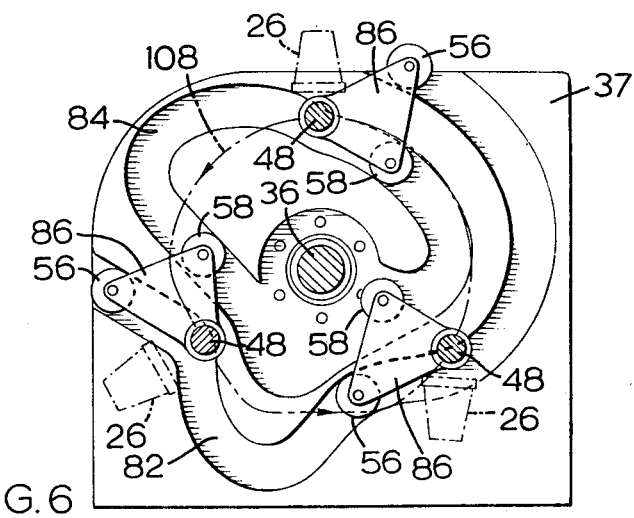
Figure 1:
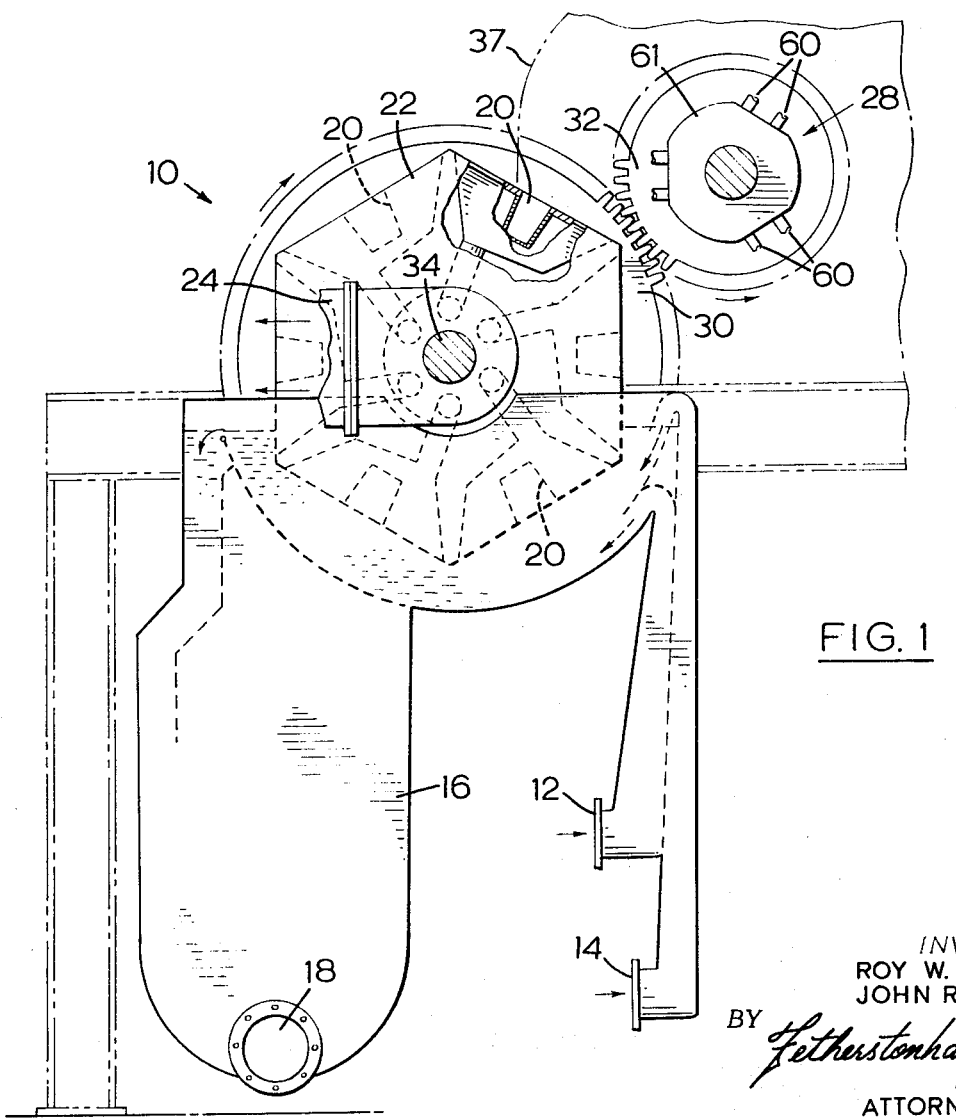
FIG. 1 is a schematic end illustration of a moulding machine.
Figure 7:
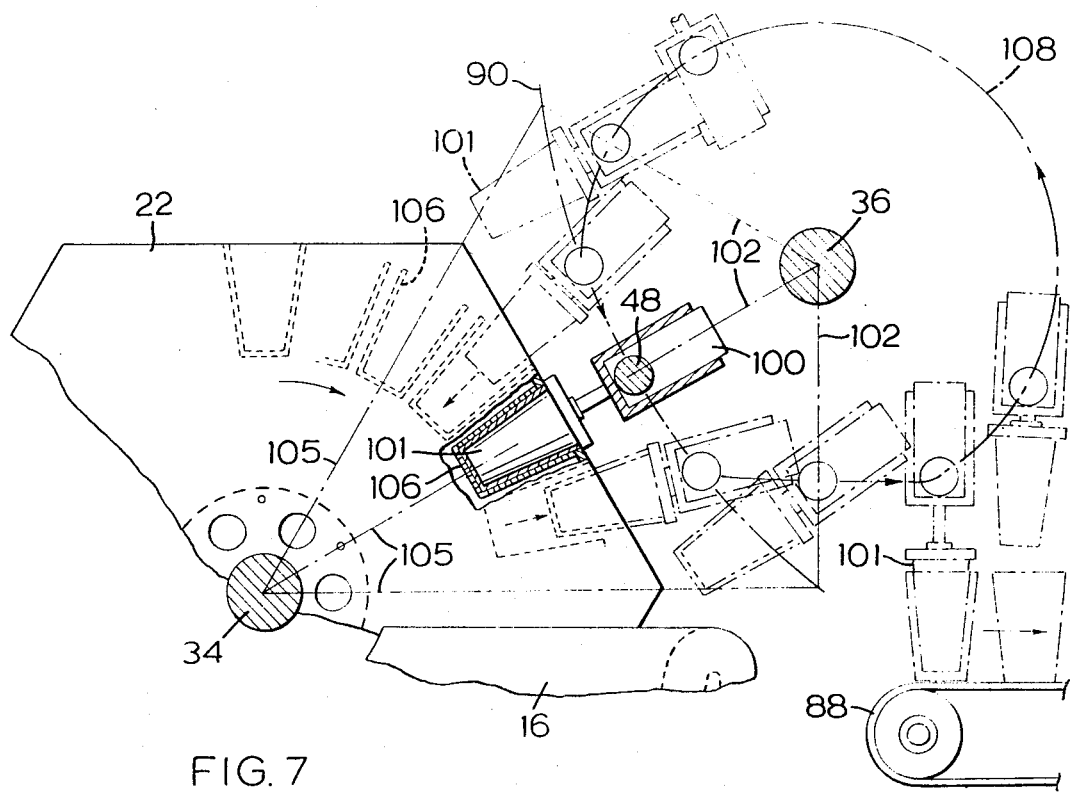

FIG. 6 is an illustration of the alignment control cams and cam followers which positively rotate the transfer moulds about their pivot axis to position the principal axes of the transfer moulds coincident with the principal axes of the forming moulds as the moulds are carried into and out of co-operative relationship with each other; and FIG. 7 is a partial end view illustrating a transfer die on a double acting cylinder and showing the sequential positions of the transfer mould and forming mould in the transfer of a deep moulded product from the forming mould to a conveyor.

In the drawings, the numeral 10 generally refers to a machine for moulding products from wood pulp fiber or like fibrous materials wherein the level and velocity of a slurry of wood pulp fiber suspended in water is maintained in vat 16 by continuously circulating the fiber slurry through the openings 12 and 14 and out the opening 18.

Foraminous forming moulds 20 of known construction rigidly mounted on the rotatably mounted forming mould carrier 22 are cyclically carried into and out of the vat 16 as the forming mould carrier 22 rotates in a clockwise direction. Forming moulds 20 have a vacuum applied to their inner wall as they pass through the vat 16 so that, as the suspending water of the slurry is drawn through the mould, a layer of fibers is deposited on the exterior side of the mould to form a moulded product. Numeral 24 generally refers to a header through which vacuum is applied to the interior of the moulds 20. A portion of the duct system to the moulds is indicated in dotted lines. Detail of the application of the vacuum to form the moulded product and the duct system is not included in this application because it is general knowledge in connection with moulding machines of this type. This invention is not concerned with the means for applying vacuum to the forming moulds 20.

After the moulds 20 pass through the vats 16, they have a layer of moulded material adhered thereto in the shape of the mould that is removed therefrom prior to their re-entry into the vat by means of foraminous transfer moulds 26, which are mounted on a rotatably mounted transfer mould carrier 28. Transfer moulds 26 are of themselves of known design. They are commonly used in machines of this type for entry into cooperative relationship with the forming moulds 20 to remove a moulded product from the forming mould. In this connection, transfer mould carrier 28 is driven in a counterclockwise direction as the forming mould carrier 22 is driven in a clockwise direction by means of co-operating gears 30 and 32. Gear 30 is carried by the rotatable shaft 34 of forming mould carrier 22 and gear 32 is carried by the rotatable shaft 36 of transfer mould carrier 28.

Drive power is applied to the main shaft 34 of the forming mould carrier 22 to cyclically rotate both carriers and carry the transfer moulds 26 into and out of co-operative relationship with the forming moulds 20 whereby to remove the moulded products from the forming moulds and deposit them on a conveyor 88 on a continuous basis.

It will be noted that there are twice as many forming moulds 20 as there are transfer moulds 26. Accordingly, the transfer mould carrier 28 is designed to rotate at twice the rotational speed of the forming mould carrier 22. The relative size of the forming mould carrier and the transfer mould carrier and their respective speeds of rotation is variable and a matter of known design in machines of this general type.

Moulding machines of this general character are common and a detailed explanation of their construction is not given in this specification. Generally speaking, the transfer mould enters and bottoms on the moulded fibers in the forming mould prior to the time that the principal axes of the two moulds are aligned and then withdraws from the forming mould due to the rotation of the two carriers. The forming mould is usually mounted resiliently in an axial direction to permit the bottoming of the carrier mould in the forming mould on either side of the point in their rotation where their axes are aligned. Vacuum applied to the interior of the transfer mould and air pressure applied to the interior of the forming mould cause the moulded product to adhere to the transfer mould as the transfer mould parts from the forming mould. These things are generally known and practiced.

This invention is concerned with an improved control means for a moulding element, in this case a transfer mould, that is adapted to control the alignment of the moulding element with the forming mould as they are carried into and out of co-operative relationship with each other. The control means can also be adapted to control the co-operative relationship of the transfer moulds with the conveyor to deposit moulded products on the conveyor on a continuous basis. Moreover, with the improved alignment control for the transfer mould, it is possible and practical to mount the transfer mould on a double acting cylinder so that products with deeper draws and steeper side walls can be manufactured without damage to the moulded product.

Figure 3:
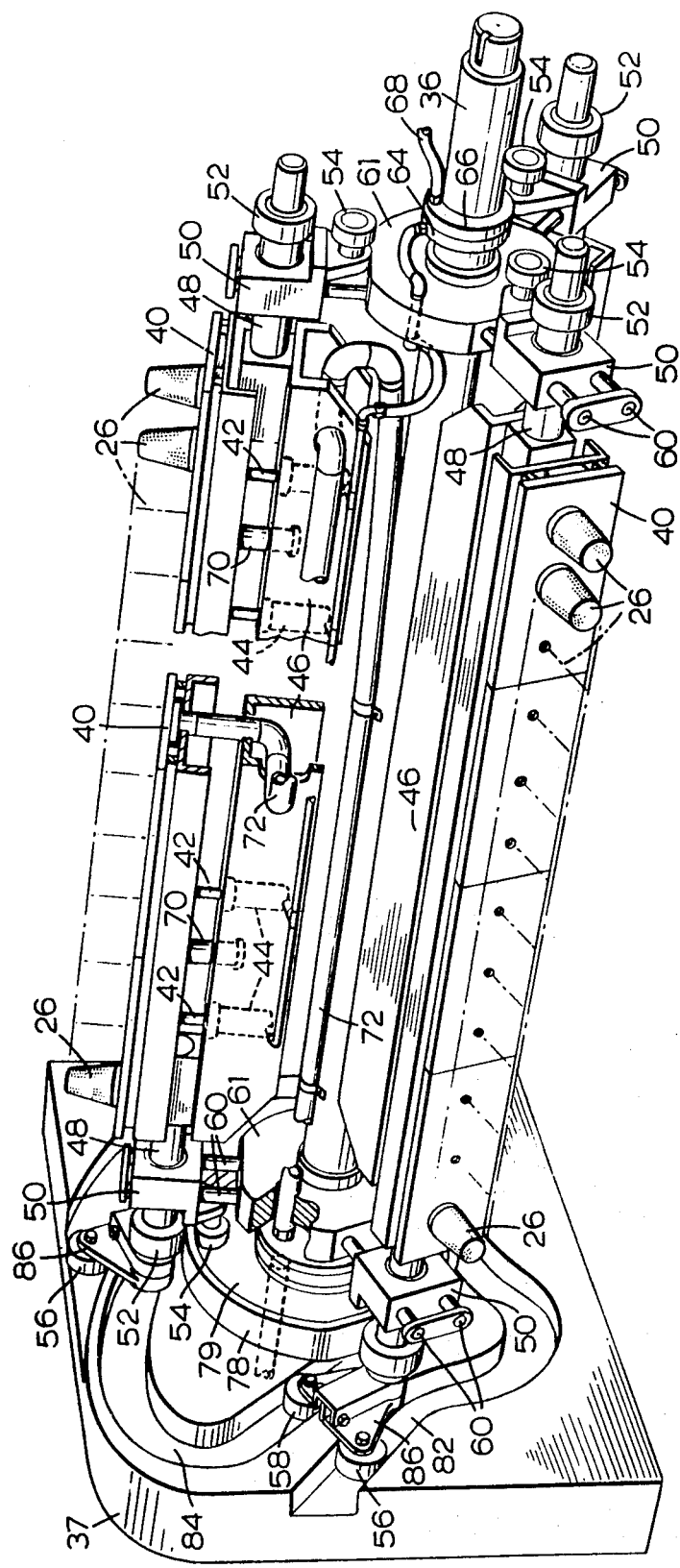
FIG. 3 is a perspective illustration of a transfer mould carrier assembly for the machine.
Figure 4:
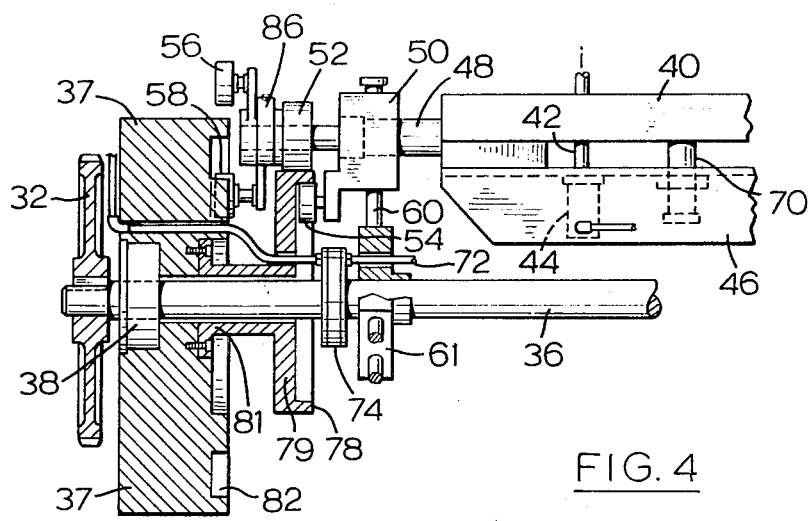
FIG. 4 is a partial sectional view of one end of the transfer mould carrier assembly.

FIG. 3 is a perspective view, partially in section and partially broken away, of an embodiment of a transfer mould carrier assembly according to this invention. The assembly is carried by shaft 36, which is journalled adjacent each of its ends for rotation in the side frames 37 of the machine as at 38 at the left hand side of the machine (see FIG. 4). Shaft 36 is mounted in a side frame in a similar bearing mount at the right hand side of the machine. In the embodiment of the invention illustrated in FIG. 3, the foraminous transfer moulds 26 are arranged in a single laterally extending row on an air header 40. The interior of each of the transfer moulds connects with the interior of header 40 so that in use, vacuum and air pressure can be supplied as required to the inside of the moulds to assist the transfer of the moulded product from the forming mould and to release the moulded product from the transfer mould to the conveyor. This general construction in connection with machines of this type is not new.

In machines of this type, provision must be made for mounting the transfer moulds so that they can yield axially of themselves as they are actuated into and out of co-operative relationship with the forming moulds; and, in this connection, header 40 is carried by the free ends of a series of piston rods 42 which extend from cylinders 44. Numerals 70 refer to guide posts upon which header 40 can reciprocate. Cylinders 44 are in turn carried by frame 46. Frame 46 has stub shafts 48 fixed to and extending from each of its ends. Stub shafts 48 are each journalled in blocks 50 and each carries a cam follower 52 inwardly of its free end that co-operates with a cam follower 54 on block 50 to control the radial disposition of the frame, as will be explained later. They also each have cam followers 56 and 58 at their free ends to control the inclination of the frame, as will be explained later. Blocks 50 are free to slide under cam action radially of the shaft 36 along guide posts 60. Base 61, from which posts 60 extend, is rigidly mounted on shaft 36.

Air is supplied to the cylinders 44 by way of a supply line that extends transversely of frame 46 through a base 61 to disc 64 of a rotary disc valve coupler. The other disc 66 of the coupler connects with an air supply line 68. Disc 64 of the valve coupler rotates with shaft 36. Disc 66 is stationary. This is a standard type of air coupler for this type of use, and it permits the maintenance of air pressure between line 68 and pistons 44 as required. In use, a pressure is maintained in the cylinders 44 that normally actuates the pistons to extend the header 40, and therefore the transfer moulds 26 which are mounted thereon, to their full extent. The pressure maintained in the cylinders 44 is such that the force exerted on the transfer moulds as they are carried into and out of co-operative relationship with the forming moulds will depress the pistons in their cylinders and permit the transfer moulds and the header to move inwardly axially of their principal axes. It is common to yieldably mount the transfer moulds for this purpose in machines of this type and no claim is being made to the novelty of this particular concept per se.

Vacuum and compressed air are supplied as required to the header 40 by means of flexible duct 72 which extends along the frame 46 and then back along the shaft 36 through the base 61 and through rotary disc valve coupler 74, one disc of which rotates with the shaft 36 and the other disc of which is stationary and connects with an air supply. Appropriately formed openings in the two discs which cyclically co-operate as the machine rotates control the application of pressure and vacuum to the interior of the transfer moulds as required. The use of this type of valve for this purpose in machines of this type is general practice. In use, a vacuum is applied to the header 40 to assist in the transfer of the moulded product from the forming mould to the transfer mould as the transfer mould moves out of co-operative relationship with the forming mould in accordance with usual practice. An air pressure is also applied to the header 40 to discharge the moulded product from the transfer mould onto a conveyor, also according to standard practice.

The improved control means according to this invention for the transfer moulds which is adapted to control the alignment of the transfer moulds with the forming moulds as they are carried into and out of co-operative relationship with each other comprises a pair of control functions. The first control function is a control means for moving the pivot axis 48 of the transfer moulds 26 with respect to the axis of rotation 36 of the transfer mould carrier to positively maintain the pivot axis 48 on a predetermined line during the transfer operation. The second control function is an alignment control means for positively rotating the transfer moulds about the pivot axis 48 to position the principal axes of the transfer moulds and the forming moulds coincident with each other as the moulds are carried into and out of co-operative relationship with each other.

The control means for moving the pivot axis 48 of the transfer moulds 26 with respect to the axis of rotation 36 of the transfer mould carrier is achieved as mounting blocks 50 for frame 46 slide radially of shaft 36 on guide posts 60. The alignment control means for positively rotating the transfer moulds 26 about their pivot axis 48 is achieved as the frame 46 pivots within blocks 50. Means are provided for positively controlling the movement of the transfer moulds in a predetermined manner in respect of their radial disposition with respect to the shaft 36 and for positively controlling their alignment as the transfer mould assembly rotates.

In the embodiment of the invention described herein, cams are employed for this purpose but means other than cams might be used within the scope of the invention for control.

The cam means for achieving the desired radial extension and the cam means for achieving inclination of the transfer moulds 26 with respect to the shaft 36 as the transfer mould assembly rotates in use are rigid with respect to the side frame 36 and are the same at each side of the machine. In FIG. 3 they have been illustrated on the left side only. The cam means for controlling the radial extension comprises a ring 78 formed on a plate 79 which is, in turn, connected to collar 81 that is rigidly secured to the frame 37. Cam follower 52 rides the outer surface of ring 78 and cam follower 54 rides the inner surface of ring 78 to control the radial disposition of the frame 46 with respect to shaft 36 as the shaft and the transfer mould carrier rotate. The manner in which it is controlled will be referred to later.

The cam means for controlling the inclination of the transfer moulds 26 comprises a pair of cam tracks 82 and 84 and cam followers 56 and 58. Cam followers 56 and 58 are carried by carriages 86, which are in turn rigidly secured to the ends of shaft 48, and as the followers ride along their respective tracks, they cause shaft 48 to turn and thereby incline the frame 48 and its transfer moulds 26. It will be noted that two cam tracks are provided and that there are two cam followers for each of the three rows of transfer moulds to control the inclination of the transfer moulds during their full 360° of rotation of the carrier but that, for the large portion of the rotational cycle, one cam and one cam follower perform the control function. The cam followers jointly control the inclination during the transition of control from one cam to the other.

In the control of the machine illustrated, the principal axis of each transfer mould 26 is rotated 60° to each side of the radius of rotation of the transfer mould carrier through its principal axis so that the total rotation is through 120°. In FIG. 6 it will be noted that cam track 84 and cam follower 58 substantially control the inclination to the left of the radius of rotation and that cam track 82 and cam follower 56 substantially control the inclination to the right of the radius of rotation.

In the drawings of this specification, only a single transverse row of transfer moulds 26 and a single row of forming moulds 20 have been shown on each face of the transfer mould carrier and the forming mould carrier. This is primarily for the purpose of illustration of this invention. It will be appreciated that it is common practice in many machines of this type to use at least two rows of transfer moulds and two rows of forming moulds on each face.

Figure 2:
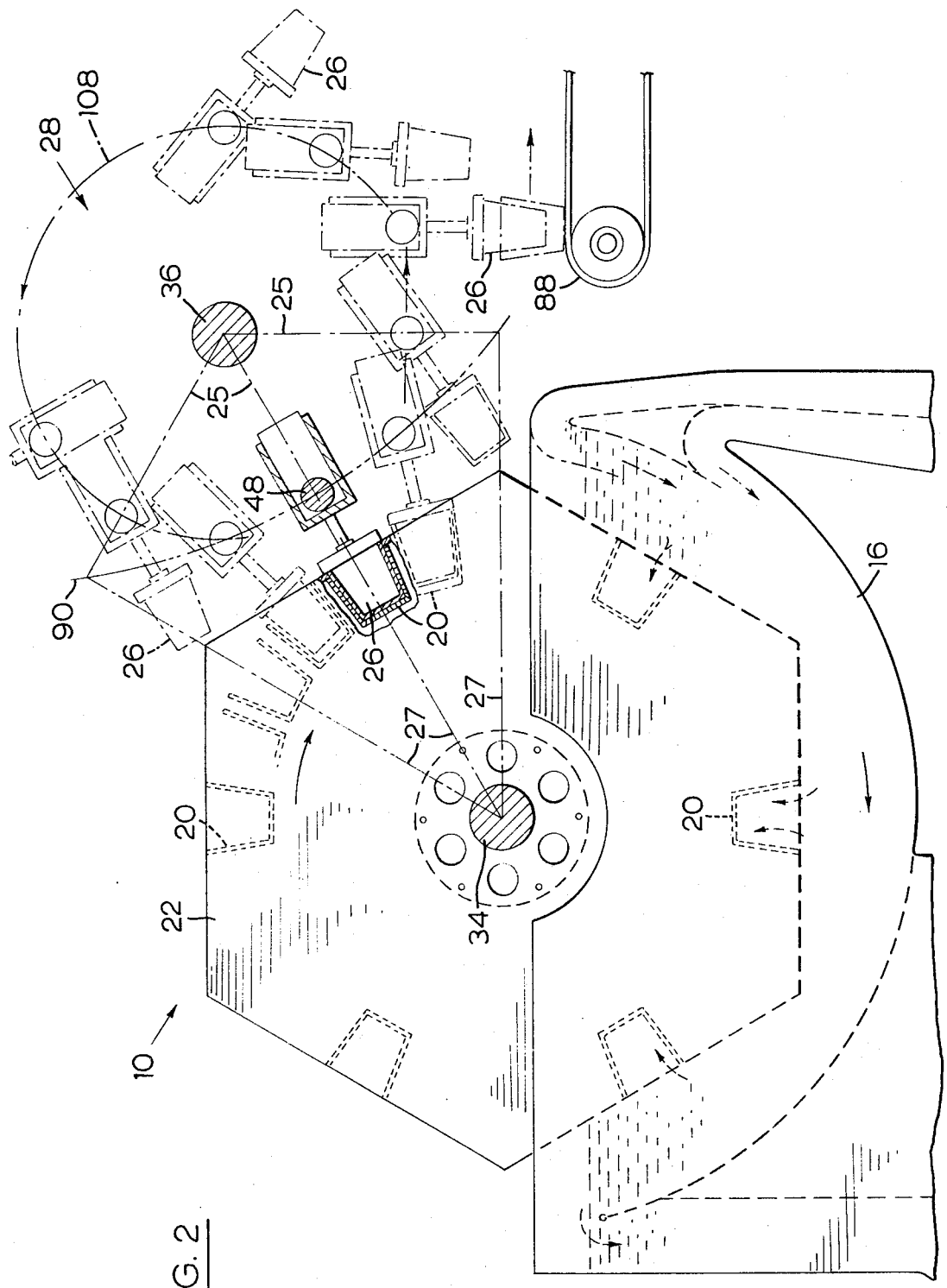
FIG. 2 is a schematic end illustration showing the upper portion of the machine of FIG. 1 and illustrating sequential positions of the transfer mould and a forming mould as they are carried into and out of co-operative relationship with each other.

Reference will now be made to FIG. 2 of the drawings. In this figure the pivot axis 48, the transfer mould 26 and the forming mould are illustrated in a sequence of positions as they enter into and out of co-operative relationship with each other. The figure also illustrates the manner in which the transfer mould deposits the moulded product that it has taken from the forming mould on a conveyor. The solid line position of the transfer and forming moulds shows them in full co-operative relation with each other with the principal axis of each aligned and extending through the center of rotation of their respective carriers 22 and 28. The dotted line positions indicate the positions of the moulds as they travel their respective cycles. It will be noted that the pivot axis 48 of the transfer moulds travels on the locus 90 as the moulds go into and out of co-operative relationship with each other. It will also be noted that the transfer moulds continually change their inclination during the transfer period.

As noted above, vacuum is applied to the interior of the forming mould 20 as it passes through vat 16 and a layer of moulding material is attracted to the moulding surface thereof as water is drawn through it, so that as it emerges from the vat it carries with it a body of moulding material having the form of the interior of the mould.

The function of the transfer mould 26 is to enter into the forming mould 20 and then retract from the forming mould and take with it the moulded material for subsequent deposit on conveyor 88.

In order to achieve an efficient transfer that does not damage the product due to uneven pressure on the side walls of the product as the transfer mould and forming mould come into full co-operative relationship, the principal axes of the transfer mould and the forming mould must be accurately aligned as the moulds approach and then move away from the solid line position illustrated in FIG. 2. If they are not properly aligned, there will be greater pressure against one side wall of the moulded product than the other and the wall of the moulded product will become weakened or broken. Difficulties with poor product resulting from misalignment of the moulds as they are carried into and out of co-operative relationship with each other increase with the depth and steepness of the walls of the moulded product and with the speed of operation of the machine.

This invention overcomes these difficulties and provides for positive control and alignment of the transfer mould and the forming mould as they approach each other and as they separate from each other in the transfer operation. With the invention, it is possible to make products having a deeper draw and steeper side walls and also possible to operate at faster rates of speed. It is also possible to provide for maintaining the moulds in full coaxial engagement for a greater period of time during their cyclic travel.

It has been found that the alignment of the principal axis of the transfer mould with the principal axis of the forming mould over the period of time that the transfer mould enters the forming mould and subsequently separates therefrom can be achieved if the pivot axis 48 of the transfer mould 26 is moved with respect to the axis of rotation 36 of the transfer mould carrier 48 to positively maintain the pivot axis 48 on the locus 90. Locus 90 is the locus of the intersections of a line 25 through the axis of rotation 36 of the transfer carrier 28 that passes through the pivot axis 48 and at right angles to the said two axes and a line 27 through the mould mounting radius of the second carrier as the moulds are carried into and out of co-operative relationship with each other by rotation of the carriers. The pivot axis 48 of each of the moulds 26 is caused to approach and follow the locus 90 as required by means of the operation of cam followers 52 and 54, which control the axial disposition of the header 40 and hence the moulds 26 from the shaft 36. The portion of the cam 78 that controls the pivot axis 48 and maintains it on the locus curve 90 during the transfer operation is the portion indicated by the numeral 104.

Figure 5:
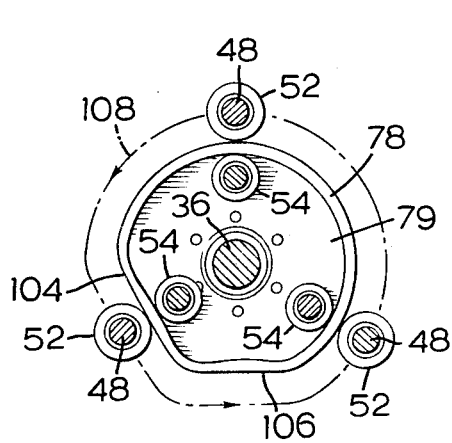
FIG. 5 is an illustration of the cam and the cam followers that control the movement of the pivot axis of the transfer moulds with respect to the center of rotation of the transfer mould carrier assembly.

For reasons which will be explained later, the pivot shafts 48 for the transfer moulds 26 move in a substantially horizontal direction towards the conveyor 88 following the transfer operation, and control for this period of the cycle is achieved by the flat portion of the cam ring 78, indicated by the numeral 106. For the balance of its cyclic travel, the pivot axis 48 follows a circular path as shown. The path of the pivot axis 48 has been indicated by an arrowed broken line 108 in FIG. 5.

As the pivot axis 48 of a transfer mould 26 approaches the locus 90, the transfer mould 26 is inclined from the position wherein its principal axis is aligned with a radius of rotation of the transfer mould carrier to a position wherein its principal axis aligns with the principal axis of the forming mould 20 with which it will mate. This alignment is maintained throughout the transfer period and it is achieved in a positive manner by means of cams 56 and 58 and cam tracks 82 and 84. Cam tracks 82 and 84 and the co-operation therein of cam followers 56 and 58 respectively are illustrated in FIG. 6 of the drawings. In this figure, path 108 of the pivot axis 48 of the transfer moulds 26 has also been indicated. It will be recalled that there are three transfer mould frames 46 on the shaft 36. They have been indicated in FIg. 6 by the representation of a single transfer mould 26. They are 120° apart and the inclination of the transfer mould 26 is illustrated in each case. It will be noted that, in the case of the top transfer mould, the cam 58 substantially controls the inclination of the transfer mould 26 by its engagement in cam track 84. Cam 56 is about to emerge from its cam track 82 and will soon lose all control. In the left transfer mould, both cams are in their respective tracks, cam 56 having just re-entered and cam 58 being about to leave its cam track and leave cam 56 in control of the inclination of the transfer moulds. In the right transfer mould, cam 56 is in full control of the inclination and cam 58 is about to enter its respective cam track. By providing two cams and cam tracks which take over from each in this way, a simple and effective manner of controlling the inclination of the transfer moulds over a wide angle that extends on both sides of a radius of rotation of the transfer moulds is provided for the transfer and the conveyor discharge operations. The alignment control means is a positive means for rotating the transfer moulds about their pivot axis to achieve alignment of the principal axis of each of the moulds during the transfer operation.

In the embodiment of the invention illustrated in FIG. 2, an air pressure is maintained in the pistons in the cylinders 44 to fully extend the piston rods at all times, but this pressure is such that the pistons will yield and extend inwardly as the transfer moulds bottom on the forming moulds and come into full co-operation prior to the mid position illustrated in the solid lines in FIG. 2. As they pass this position and the moulds separate due to the rotation of the carriers, the pressure in the cylinders 44 causes the pistons to re-assert themselves and the transfer moulds extend again to their full extended position. The depth of the moulded product is such that the transfer mould comes into and out of co-operative relationship with the forming die, as indicated by the sequence of dotted line positions as the forming mould carrier and the transfer die carrier rotate.

The stroke and the maximum extension of the piston rod are so selected that the transfer mould reaches full engagement with the moulded product at a predetermined point prior to the solid line position, and the further decreasing and subsequently increasing distances between the moulds are accommodated by movement of the piston rod, while the transfer mould is pressed against the moulded product for a predetermined length of travel, after which the moulded product is disengaged from the forming mould by a puff of compressed air applied through the forming mould 20 and at the same time is attracted to and retained on the transfer mould by vacuum applied through the header 40. Thus, the transfer mould and the moulded product retained on it are removed from the forming mould.

Following disengagement of the moulds, the pivot axis 48 of the transfer mould 26 moves in a substantially horizontal direction until it reaches a point that is substantially beyond a vertical line through the axis of rotation 36 of the transfer mould carrier. At the same time, the inclination of the transfer mould 26 is gradually changed so that its principal axis is vertical at the same point. This is the discharge point for the moulded product to an underlying conveyor 88.

When the transfer die reaches this point, a puff of air through the transfer die from the header 40 separates the product from the transfer die and deposits it on the conveyor. Further rotation causes the transfer die to rise as the conveyor moves in a horizontal direction. It will be noted that the rise is quite steep and that the component of velocity of axis 48 in a vertical direction is substantial in proportion to the component in a substantially horizontal direction because the transfer point is substantially beyond the line vertically through the center of rotation of the transfer mould.

The transfer mould and the forming mould are each symmetrical and the principal axis of each extends in a longitudinal direction through its center. The principal axis of the forming mould 26 is a mould mounting radius of the forming mould carrier 22. A mould mounting radius is a line that extends radially outwardly of the center of rotation of the forming mould carrier 10 at right angles thereto.

It will be noted that the principal axis of the forming moulds 26 coincides with the mould mounting radius of the carrier 20. This is not necessary. In fact, it would not be the case in the event that two transverse rows of moulds were mounted on a mould assembly. If the forming moulds are to the right or to the left of the mould mounting radius that is taken to trace out the locus 90, as explained above, their principal axes must be parallel with the mould mounting radius that is taken to form the locus 90. It thus is only necessary that the principal axis of the forming moulds 20 be in the same direction as the forming mould mounting radius. They can be spaced from it and, in the case where more than one row is used, they would be spaced from it.

With this invention, it is possible to mould products having a much deeper draw than those illustrated in FIG. 2 of the drawings by replacing cylinder 44 with a double acting cylinder and using deeper moulds. In FIG. 7, there is shown similar sequence to FIG. 2 but using deeper moulds and a double acting cylinder.

As the pivot axis 48 of the transfer moulds approaches the locus 90, cams 84 and 82 and their respective cam followers 56 and 58 operate to incline the principal axis of the transfer mould about pivot axis 48 from alignment with the radius of rotation of the transfer mould carrier 28 to alignment with the principal axis of the forming moulds as before but cylinder 100 replaces cylinder 44 and has a double acting piston that can be actuated between an extended and a retracted position. As it approaches the locus 90, the piston is in its retracted position but when alignment of the principal axis of the deep transfer mould 102 and the deep forming mould 106 is achieved on the locus 90, the cylinder 100 operates to plunge the transfer mould 101 close to the bottom of the forming mould, as indicated by the tip of the arrow. This, it will be noted, occurs before the solid center position is reached. Further rotation of the two carriers brings the two moulds into full co-operative relationship and then out of full co-operative relationship.

The stroke and the maximum extension of the piston rod are so selected that the deep transfer mould 101 reaches full engagement with the moulded product in the deep forming mould 106 at a predetermined point prior to crossing the solid line position and further decreased and subsequently increased distances between the pivot axis 48 of the transfer mould and the deep forming mould 106 are accomodated by the movement of the piston in the cylinder, while the transfer mould 101 is pressed against the moulded product in the forming mould 106 for a predetermined length of travel, as before. The moulded product is disengaged from the deep forming mould by a puff of compressed air applied through the deep forming mould 106 and at the same time is attracted to and retained on the transfer mould by a vacuum applied through the transfer mould and the transfer mould and the moulded product retained on it are removed from within the forming mould by reason of the progressively increasing distance between them resulting from the continuing rotation of the two carriers as before.

After the moulds have separated and the product has been transferred to the deep transfer mould, double acting cylinder 100 is operated to retract the piston to partially withdraw the transfer mould from the forming mould, as indicated by the arrow. Further rotation of the carriers entirely removes the deep transfer mould with the moulded product that has been transferred thereto from the deep forming mould as cams 84 and 82 swing the principal axis of the transfer die to the right and as pivot axis 48 leaves locus 90.

The piston of double acting cylinder 100 is then extended again and the deep transfer mould 101 continues to turn under the influence of cam followers 56 and 58 until it is in a vertical position as it travels in a substantially horizontal direction towards the conveyor 88 and until it overlies the point of discharge thereon. At the point of discharge, the article is forced from the mould by a puff of air through the deep transfer mould 101 and the piston of the cylinder 100 is immediately retracted to substantially with-draw the transfer mould from the product. Further rotation of the transfer mould carrier carries the retracted deep transfer mould 101 in an upward direction to clear the moulded product as indicated. After clearance, the transfer mould is again rotated to cause its principal axis to align with a radius of rotation of the transfer mould carrier and, on further rotation, the above described cycle is repeated.

Double acting cylinder 100 is of standard design with an air input at each end so that the piston can be actuated in either direction as required. Supply of air to the two ends of the cylinder to perform the above described function is achieved through a supply line to each end controlled from a rotary disc type valve. The selection of rotary valves and the double acting cylinders to perform these functions is well known to persons in this field.

It is not intended that the invention should be limited to the use of the particular expedients described or to the particular embodiment of the invention described. For example, means other than air operated cylinders may be used to achieve the necessary resilience and/or extension of the transfer moulds. Means other than cams may be used to achieve the necessary inclination of the transfer moulds. The invention may also be used to achieve alignment of moulding elements other than a forming mould and a transfer mould. For example, a compacting mould that enters the forming mould may be employed before the moulded article is engaged by the transfer mould. The invention consists essentially of a novel concept in alignment from which substantial advantages flow. It is not intended that the invention should be restricted except by the claims which follow.

What I claim as my invention is:

1. In a moulding machine of the type having a plurality of first moulding elements, each having a central mould axis, a plurality of second moulding elements, each having a central mould axis, a first carrier for said first moulding elements, a second carrier for said second moulding elements, said carriers being rotatably mounted about parallel axes for continuous synchronized rotation in opposite directions to cyclically carry individual elements of said first moulding elements into and out of cooperative relationship with individual elements of said second moulding elements during their cyclic travel, the second moulding elements being forming moulds and during their cyclic travel, prior to entering into its cooperative relationship with said first moulding elements, being adapted to accrete a layer of moulding material thereon, an improved control means for said first moulding elements for controlling the alignment of said first moulding elements with said second moulding elements as they are carried into and out of cooperative relationship with each other comprising means for mounting said first moulding elements for pivotal movement on said first carrier about a single pivot axis, said pivot axis being movable radially of the center of rotation of said first carrier, said second moulding elements being mounted on said second carrier and each second moulding element having its central axis aligned in the same direction as a radius of said second carrier, pivot axis control means connected to said pivot axis for moving said pivot axis radially with respect to the axis of rotation of said first carrier to positively maintain said pivot axis on the locus of the intersection of a line through the axis of rotation of said first carrier that passes through said pivot axis and a line from the center of rotation of said second carrier through the central axis of the second mould element as said moulds are carried into and out of cooperative relationship with each other, rotational control means connected to said first moulding elements for positively rotating said first moulding elements about their said pivot axis to position the central axes of said first moulding elements coincident with the central axes of said second moulding elements with which they cooperate as said moulds are carried into and out of cooperative relationship with each other.

2. In a moulding machine of the type specified in claim 1, an improved control means as claimed in claim 1, said first moulding elements being transfer moulds for receiving a moulded product from said forming moulds as they cooperatively engage therewith, said pivot axis control means for moving said pivot axis being operable to positively maintain said pivot axis in a substantially linear horizontal path to a discharge point after said transfer moulds disengage from said forming moulds, said discharge point being substantially beyond a vertical line through the axis of rotation of said first carrier, said rotational control means being operable to rotate the central axis of said transfer moulds into a vertical position as they approach said discharge point, a conveyor underlying said discharge point for receiving a moulded product discharged from said transfer mould at said discharge point, said pivot axis control means being operable to move said pivot axis in a path having a relatively large vertical to horizontal component after said discharge point.

3. In a moulding machine of the type claimed in claim 1, an improved control means for said moulding elements including axial control means connected to said first moulding elements for moving said first moulding elements axially of themselves under control from a retracted position to an extended position as said moulding elements approach each other due to rotation of said carriers and for moving said first moulding element to re-assume said retracted position as said moulding elements separate from each other due to rotation of said carriers.

4. In a moulding machine of the type claimed in claim 1, an improved control means for said moulding elements including axial control means connected to said first moulding elements for moving said first moulding elements axially of themselves under control from a retracted position to an extended position as said moulding elements approach each other due to rotation of said carriers and for moving first moulding elements to re-assume said retracted position as said moulding elements separate from each other due to rotation of said carriers, and for moving said first moulding elements from said extended position prior to reaching said discharge point to again reassume said retracted position immediately after reaching said discharge point.

* * * * *